US011904331B2

(12) United States Patent
Gleixner (10) Patent No.: US 11,904,331 B2
(45) Date of Patent: *Feb. 20, 2024

(54) DISPENSER CONTAINER

(71) Applicant: INOTECH Kunststofftechnik GmbH, Nabburg (DE)

(72) Inventor: Josef Gleixner, Nabburg (DE)

(73) Assignee: INOTECH Kunststofftechnik Gmbh, Nabburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,404

(22) Filed: Oct. 29, 2021

(65) Prior Publication Data

US 2022/0048057 A1 Feb. 17, 2022

Related U.S. Application Data

(63) Continuation of application No. 16/611,440, filed as application No. PCT/EP2018/056090 on Mar. 12, 2018, now Pat. No. 11,185,878.

(30) Foreign Application Priority Data

Sep. 19, 2017 (DE) .................. 10 2017 121702.9

(51) Int. Cl.
*B65D 23/02* (2006.01)
*B05B 11/10* (2023.01)
(Continued)

(52) U.S. Cl.
CPC ........ *B05B 11/1047* (2023.01); *B05B 11/026* (2023.01); *B29C 49/06* (2013.01); (Continued)

(58) Field of Classification Search
CPC ....... B29C 49/06; B29C 49/221; B29C 49/22; B29C 49/04; B29C 49/24; B65D 1/0215; (Continued)

(56) References Cited

U.S. PATENT DOCUMENTS 4,098,434 A 7/1978 Uhlig
5,513,761 A * 5/1996 Kobayashi ......... B65D 83/0055
222/105

(Continued)

FOREIGN PATENT DOCUMENTS

CN 1150782 5/1997
CN 101663149 3/2010
(Continued)

OTHER PUBLICATIONS

Machine Translation of the Description DE102014113535B4 (Year: 2016).*

(Continued)

*Primary Examiner* — Charles P. Cheyney
(74) *Attorney, Agent, or Firm* — AVEK IP, LLC; Kent R. Erickson (57) ABSTRACT

The invention relates to a dispenser container consisting of an outer container and an inner container for receiving a fluid, wherein the outer container and the inner container are formed from blow-moulded plastics, which do not form an integral connection with one another, and wherein a first plastic from which the inner container is formed has a higher elasticity than a second plastic from which the outer container is formed, such that the inner container is deformable, and wherein the outer container has at least one pressure compensation opening for pressure compensation in the region between the outer container and the inner container, wherein the inner container has a first outlet region and the outer container has a second outlet region, wherein the first outlet region can be shifted relative to the second outlet region in an outlet direction.

8 Claims, 5 Drawing Sheets

(51) Int. Cl.
  *B29C 49/06* (2006.01)
  *B05B 11/02* (2023.01)
  *B29L 31/00* (2006.01)
(52) U.S. Cl.
  CPC .............. *B29C 2949/3032* (2022.05); *B29C 2949/3034* (2022.05); *B29L 2031/712* (2013.01)
(58) Field of Classification Search
  CPC .......... B05B 11/3047; B05B 11/00412; B05B 11/30; B05B 11/0038; B05B 11/0037; B29B 2911/1414; B29L 2031/712
  USPC .... 215/12.1, 902; 222/105, 107, 95, 94, 183
  See application file for complete search history.

(56) References Cited

U.S. PATENT DOCUMENTS

| | | | | |
|---|---|---|---|---|
| 5,569,473 | A * | 10/1996 | Bright | B29C 49/24 264/513 |
| 5,921,416 | A * | 7/1999 | Uehara | B29C 49/18 264/516 |
| 6,467,653 | B1 * | 10/2002 | Hamamoto | A45D 24/28 222/481.5 |
| 7,451,884 | B2 * | 11/2008 | Kuehn | B65D 1/0215 220/915 |
| 9,387,951 | B2 * | 7/2016 | Miyajima | B65D 77/225 |
| 9,849,621 | B2 * | 12/2017 | Van Hove | B65D 25/16 |
| 9,908,130 | B2 * | 3/2018 | Moretti | B05B 11/3043 |
| 10,329,076 | B2 * | 6/2019 | Kitora | B65D 1/42 |
| 11,185,878 | B2 | 11/2021 | Gleixner | |
| 2004/0112921 | A1 * | 6/2004 | Nomoto | B05B 11/00412 222/321.9 |
| 2005/0067432 | A1 * | 3/2005 | Bonneyrat | B65D 83/0055 222/105 |
| 2008/0257847 | A1 | 10/2008 | Van Hove et al. | |
| 2012/0279995 | A1 | 11/2012 | Bugenske et al. | |
| 2015/0210420 | A1 * | 7/2015 | Hosokoshiyama | B29B 11/14 215/44 |
| 2020/0385171 | A1 * | 12/2020 | Akuzawa | B65D 23/02 |

FOREIGN PATENT DOCUMENTS

| | | | |
|---|---|---|---|
| CN | 103764516 | 4/2014 | |
| DE | 102014113535 A1 * | 3/2016 | ......... B29C 45/1684 |
| EP | 0505611 | 9/1992 | |
| EP | 1510472 | 3/2005 | |
| JP | 2014-028636 | 2/2014 | |
| JP | 2016-216081 | 12/2016 | |
| JP | 2016-216082 | 12/2016 | |
| WO | 2000/048925 | 8/2000 | |

OTHER PUBLICATIONS

Australian Office Action, dated Dec. 5, 2019, in Australian Patent Application No. 2018334971, 4 pp.
Canadian Examiner Requisition dated Dec. 4, 2019, in Canadian Patent Application 3,061,813, 4 pp.
Chinese First Office Action dated Feb. 3, 2021 in Chinese Application No. 201880030161.
Chinese Search Report dated Jan. 27, 2021 in Chinese Application No. 201880030161.
Chinese Second Office Action dated Aug. 2, 2021 in Chinese Application No. 201880030161.
European Office Action, dated Sep. 7, 2020, corresponding to European Patent Application No. 18712816.0, first 3 pages.
Indian Office action, dated Aug. 5, 2020, corresponding to Indian Patent Application No. 201927045164, first 3 pages.
Japanese Office Action dated Mar. 31, 2021 in Japanese Patent Application No. 2019-561247, 2 pages.
Japanese Written Opinion dated Jul. 26, 2021 in Japanese Application No. 2019-561247.
Korean Office Action dated Jan. 19, 2021, in Korean Patent Application No. 10-2019-7032869, 9 pages.
Korean Written Opinion dated May 25, 2021 in Korean Application No. 10-2019-7032869.
Korean Written Opinion dated Jan. 12, 2022 in Korean Appliation No. 10-2019-7032869.
Korean Written Opinion dated Jul. 25, 2022 in Korean Appliation No. 10-2019-7032869.
Search Report and Written Opinion with English translation, dated May 16, 2018, corresponding to International Application No. PCT/EP2018/056090, 13 pp.
U.S. Appl. No. 16/611,440, filed Nov. 6, 2019.

* cited by examiner

DISPENSER CONTAINER

CROSS-REFERENCE TO RELATED APPLICATIONS

This application is a continuation of U.S. application Ser. No. 16/611,440, filed Nov. 6, 2019, which was a national stage application under 35 U.S.C. § 371 of International Application No. PCT/EP2018/056090, filed Mar. 12, 2018, which claims the benefit of priority from German Patent Application No. 10 2017 121 702.9, filed Sep. 19, 2017, each of which is hereby incorporated by reference in its entirety to the extent not inconsistent herewith.

BACKGROUND OF THE INVENTION

The invention relates to a dispenser container consisting of an outer container and an inner container for receiving a fluid, wherein the outer container and the inner container are formed from blow-moulded plastics, which do not form an integral connection with one another, and a first plastic from which the inner container is formed has a higher elasticity than a second plastic from which the outer container is formed, such that the inner container is deformable, and wherein the outer container has at least one pressure compensation opening for pressure compensation in the region between the outer container and the inner container.

Dispenser containers of this type are known in the art, for example from DE 10 2014 113 535, wherein in this dispenser container a negative pressure is generated by withdrawing fluid from the inner container and is compensated through a pressure compensation opening in the outer container, and wherein the inner container is deformed in the base region or the central region, it being possible for dirt particles and harmful particles to penetrate into the dispenser container through the pressure compensation opening in the base region, potentially damaging the dispenser container.

Therefore, the object of the present invention is to provide an alternative ventilation design for a dispenser container and to overcome the drawbacks of the prior art.

This object is achieved in accordance with the features of claim 1.

SUMMARY OF THE INVENTION

An essential point of the invention is to provide a dispenser container consisting of an outer container and an inner container for receiving a fluid, wherein the outer container and the inner container are formed from blow-moulded plastics, which do not form an integral connection with one another, and a first plastic from which the inner container is formed has a higher elasticity than a second plastic from which the outer container is formed, such that the inner container is deformable, and wherein the outer container has at least one pressure compensation opening for pressure compensation in the region between the outer container and the inner container, wherein the inner container has a first outlet region and the outer container has a second outlet region, the first outlet region being shiftable relative to the second outlet region in an outlet direction.

Alternatively, the concept of the outlet direction can also be understood as a longitudinal direction. Advantageously, the dispenser container, and in particular each of the outer container and the inner container, comprises a base region and a central region, the base region being connected to the central region and the central region being connected to the outlet region in each case.

According to the invention, the first outlet region is shiftable relative to the second outlet region in the outlet direction. This means that there are two states, a shifted state and an unshifted state, the inner container being undeformed in the unshifted state and the inner container being deformed in the shifted state.

A shift may for example be brought about by an external action of force on the first outlet region, the first outlet region being shifted accordingly by the shift movement and the inner container thus being deformed.

The outlet region should be understood in particular as the region on which for example a pump device for withdrawing a fluid from the inner container may be arranged.

In a preferred embodiment, the first outlet region extends further in the outlet direction than the second outlet region, at least in part.

This means that there are portions of the first outlet region which extend further in the outlet direction than any region of the second outlet region. In particular, it is advantageous if the first outlet region as a whole extends further than the second outlet region.

In particular, it is conceivable that a first end of the first outlet region is arranged further away from the dispenser container than a corresponding first end of the second outlet region.

In a further preferred embodiment, the inner container has, on an outer face, at least one complementary projection for sealing the pressure compensation opening, said projection projecting into the pressure compensation opening and being non-positively connected to the pressure compensation opening before a shift of the first outlet region relative to the second outlet region, and the first projection being released from the pressure compensation opening after a shift of the first outlet region.

This means that when the first outlet region is shifted with respect to the second outlet region, in other words is in the shifted state, the pressure compensation opening is no longer sealed and pressure compensation in the region between the inner container and the outer container is thus made possible. Pressure compensation is therefore already possible before fluid is actually withdrawn from the inner container. In the prior art, ventilation or pressure compensation is possible when a fluid is withdrawn from the inner container. If a corresponding pump device is mounted or fitted, pressure compensation is therefore provided even before the pump device is first used.

In a further preferred embodiment, the pressure compensation opening is arranged on the second outlet region.

In particular, it is also conceivable for the pressure compensation opening to be arranged at the transition between the outlet region and the central region.

In a further preferred embodiment, the first outlet region has a second projection, which extends substantially perpendicular to the outlet direction and, in the outlet direction, is at a first spacing from the second outlet region before the shift and at a second spacing from the second outlet region after the shift, the second spacing being less than the first spacing.

Preferably, the first spacing is in a range of 1-10 mm.

Also preferably, the second spacing is at most 0.5 mm, more preferably at most 0.1 mm and particularly preferably 0 mm.

As a result, a better sealing effect can be achieved between the inner container and the outer container in the outlet region, since there is some lack of tightness as a result of the shiftability of the first outlet region with respect to the second outlet region.

In a further preferred embodiment, the second outlet region has a third projection, which extends substantially perpendicular to the outlet direction. By means of the third projection, it is possible in particular to mount a pump device on the dispenser container. For this purpose, the third projection serves as part of a holding device for holding the pump device with respect to the dispenser container.

The invention is further directed to a pump device for fitting on a dispenser container, wherein the pump device is formed in such a way that the first outlet region is shifted relative to the second outlet region while the pump device is being fitted on the dispenser container.

Particularly preferably, after the pump device is fitted on the dispenser container, the first outlet region is in the shifted state and is held in this shifted state.

In a preferred embodiment, a holding device of the pump device is provided with a fourth projection, which, after the fitting, interacts with the third projection, in particular being connected by means of at least one selected from the group of snap-on, click, crimp and screw connection.

Further, a device is provided for manufacturing a dispenser container, consisting of an outer container and an inner container for receiving a fluid, using a blow-moulding method for injection-moulding a preform and for stretch-blowing the preform within the same device, the device comprising:
  a. a multi-component injection-moulding means for injecting on the preform which consists of at least two layers, the plastic of the first layer not forming an integral connection with the plastic of the second layer and the plastic of the first layer having a higher elasticity than the plastic of the second layer;
  b. an injection blow-moulding core, to which the layers which form the preform are applied;
  c. a first cavity for forming the first layer;
  d. a second cavity for forming a second layer, into which a slider core can be introduced;
  e. a slider core comprising at least one slider projection, which projects into the second cavity, the at least one slider projection, located in the second cavity, of the slider core recessing at least one region in the second layer, which region forms at least one pressure compensation opening in the outer container;
  f. a stretch-blowing means for stretch-blowing the preform, which is heated by an injection-moulding process and is at a working temperature required for the stretch-blowing, to form the dispenser container,
wherein the first cavity and the second cavity are formed in such a way that after the stretch-blowing it is possible to shift the first outlet region relative to the second outlet region.

In a preferred embodiment, the first cavity comprises an enlargement region, which is provided for and suitable for forming the first projection, the slider core projecting into the second cavity at the enlargement region, being in contact with said region, and being provided for and suitable for forming the pressure compensation opening.

A method for assembling a dispenser container with a pump device is further provided, comprising the method steps of:
  a. providing the dispenser container and the pump device;
  b. arranging and contacting the pump device on the dispenser container;
  c. exerting a force on the pump device along the outlet direction and shifting the first outlet region relative to the second outlet region;
  d. connecting the pump device and the dispenser container.

It is further advantageous if the outer container and the inner container consist of thermoplastics or elastomers.

Further advantageous embodiments are apparent from the dependent claims.

BRIEF DESCRIPTION OF THE DRAWINGS

Further aims, advantages and expediencies of the present invention can be derived from the following description in connection with the drawings, in which.

DETAILED DESCRIPTION OF THE INVENTION

Figure 1:
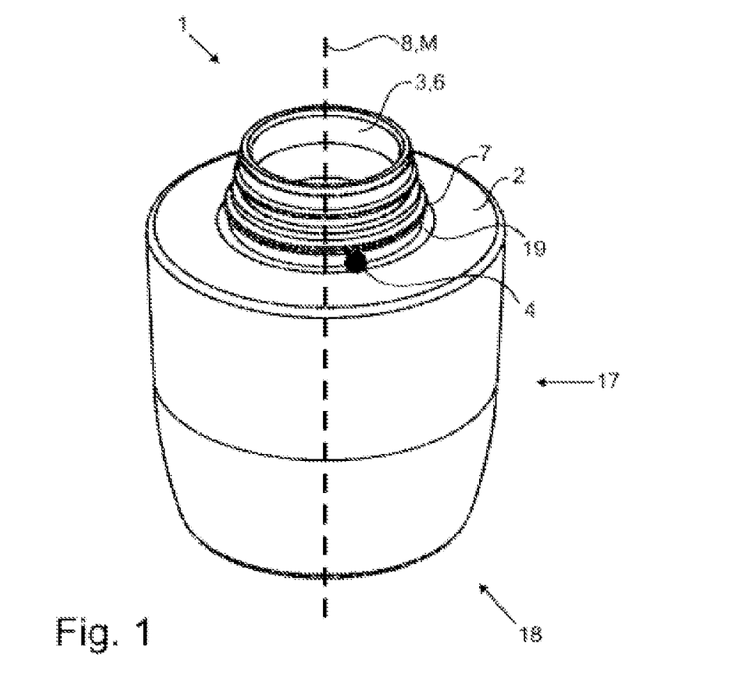
FIG. 1 is a perspective view of a dispenser container.

FIG. 1 is a perspective view of a dispenser container 1 comprising an outer container 2 and an inner container 3, in particular the outer container 2 being discernible in FIG. 1. Further, the outer container 2 and the inner container 3 each comprise a central region 17 and a base region 18, which are described in greater detail in the following.

Further, a first outlet region 6 of the inner container 3 and a second outlet region 7 of the outer container 2 are discernible, the first outlet region 6 being arranged within the second outlet region 7 at least in part as seen in a direction perpendicular to an outlet direction 8.

Moreover, a pressure compensation opening 4 is likewise discernible, and is arranged on the second outlet region 7, the pressure compensation opening 4 preferably being arranged in a first transition region 19 from the second outlet region 7 to the central region 17 of the outer container 2.

Figure 2A:
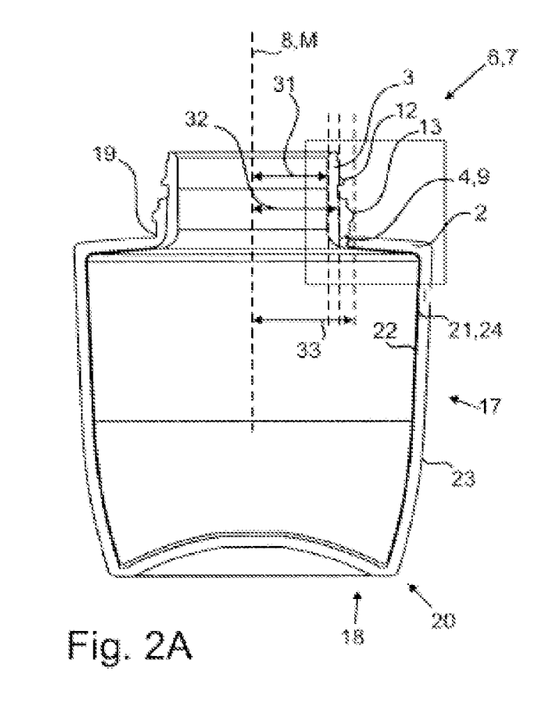
FIG. 2A is a cross section of a dispenser container in accordance with a preferred embodiment.
Figure 2B:
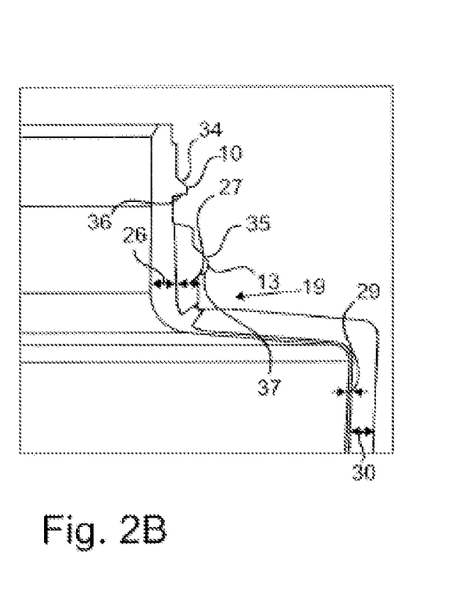
FIG. 2B is a detail of FIG. 2A.

FIG. 2A is a sectional drawing of the dispenser container 1 in accordance with a preferred embodiment, FIG. 2B being a detail of FIG. 2A.

As can be seen, the inner container 3 has an outer face 21 and an inner face 22, the outer face 21 of the inner container 3 being in contact at least in part with an inner face 24 of the outer container 2, and the inner face 24 being in contact with a fluid. Further, the outer container 2 has an outer face 23, which is in contact with the environment. Between the inner container 3 and the outer container 2, a region 25 is arranged, which is not yet shown here. This region 25 corresponds to a volume which arises between the outer container 2 and the inner container 3 when fluid is withdrawn from the inner container 3, the inner container 3 deforms as a result, in particular contracting or shrinking, and the region 25 arises as a result. The region 25 is thus in contact with the pressure compensation opening 4.

As stated previously, the outer container 2 has the pressure compensation opening 4, the inner container 3 having a first projection 9 which, in the unshifted state of the first outlet region 6, is connected to and seals the pressure compensation opening 4, the first projection 9 being formed complementary to the pressure compensation opening 4.

FIG. 2B is a detail showing an enlargement of the outlet region of the dispenser container 1, comprising the first outlet region 6 and the second outlet region 7.

The first outlet region 6 further has a second projection 12, which extends substantially perpendicular to the outlet direction 8. The second outlet region 7, by contrast, comprises a third projection 13, which is arranged below the second projection 12 in the outlet direction 8.

Particularly preferably, the pressure compensation opening 4 is formed frustum-shaped, the top face of the pressure compensation opening 4 being arranged on the outer face 23 of the outer container 2 and the base face of the pressure compensation opening 4 being arranged on the inner face 24 of the outer container 2. In this context, it should be noted that the top face and the base face are imaginary, since they are supposed to represent an opening.

In this context, in the region of the outlet region 28, which comprises the first outlet region 6 and the second outlet region 7, of the dispenser container 1, a first thickness 26 of the inner container 3 and a second thickness of the outer container 2 may be substantially constant. Also advantageously, it is conceivable for the first thickness 26 and the second thickness 27 of the corresponding outlet regions 6, 7 to be substantially equal. In this context, the thickness is to be measured perpendicular to the outlet direction 8 in each case, any projections not being taken into account in this context.

The thicknesses in the central region 17 and the thicknesses in the base region 18 are preferably likewise constant, the third thickness 29 of the inner container in the region of the central region 17 and of the base region and a fourth thickness 30 of the outer container 2 in the region of the central region 17 and of the base region 18 being constant, it being advantageous for the third thickness 29 to be less than the fourth thickness 30. Also advantageously, the second thickness 27 corresponds to the fourth thickness 30, meaning that the outer container 2 has a wall thickness that is constant throughout. By contrast, it is advantageous if the first thickness 26 is greater than the third thickness 29, in other words for the inner container 3 to be formed thinner-walled in the central region 17 and in the base region 18 than in the outlet region 6. As a result, the inner container 3 can contract and deform much more easily when fluid is withdrawn.

Also advantageously, the thickness of the inner container 3 varies as follows. In the first outlet region 6 a first thickness 26 is provided, whilst in the central region 17 and in the base region 18 a third thickness 28 is provided. At the transition 19 between the outlet region 6 and the central region 17, the inner container 3 is formed in such a way that the thickness of the inner container 3 decreases to the third thickness 28. In particular, the thickness transition is formed continuously, in other words without abrupt jumps in thickness.

Particularly advantageously, the outlet direction 8 also corresponds to a central axis M of the first or second outlet region 6, 7, the outlet regions 6, 7 being formed substantially cylindrical, having a first internal radius 31 and a second internal radius 32. It is further preferred for the pressure compensation opening 4 to be arranged within a region having a first distance 33 as a radius about the central axis M, the first distance being arranged between the central axis M and the farthest point, as seen perpendicular to the central axis M, of the third projection 13.

Moreover, the second projection 10 and the third projection 13 each have a first portion 34, 35, which is at an angle to the central axis M in cross section, the angle being in a range of 30° to 60°, more preferably in a range of 40° to 50°, and preferably being 45°. Also preferably, the second projection 10 and the third projection 13 may each have a second portion 36, 37 which extends substantially perpendicular to the central axis M in cross section.

Figure 3A:
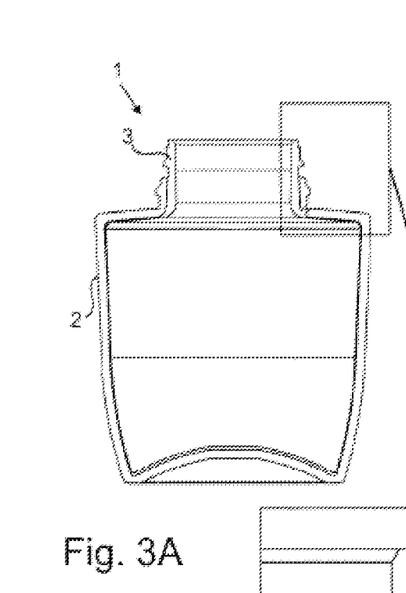
FIG. 3A is a cross section of a dispenser container in the unshifted state.

FIG. 3A and the detail of FIG. 3A shown in FIG. 3B again show the dispenser container in an unshifted state, meaning that the first outlet region 6 is unshifted with respect to the second outlet region 7.

Figure 3B:
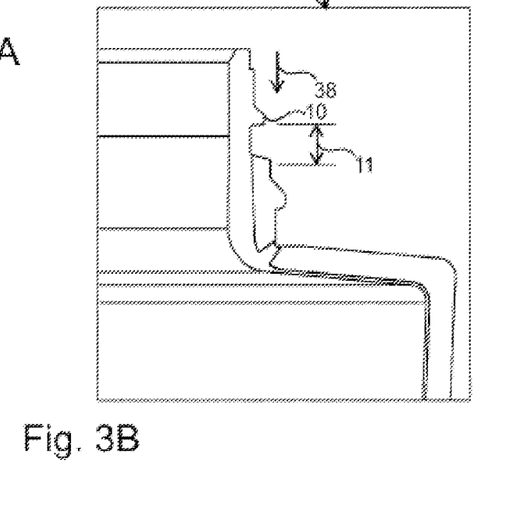
FIG. 3B is a detail of FIG. 3A.

As can be seen from FIGS. 3A and 3B, in this context the second projection 10, as seen in the outlet direction 8, is arranged at a first spacing 11 from the second outlet region 7 of the outer container 2. The arrow 38 specifies a shift direction 38 in which the first outlet region 6 is shiftable. In this context, the first projection is connected to the pressure compensation opening 4 in such a way that the pressure compensation opening 4 is sealed.

Figures 4A, 4B:
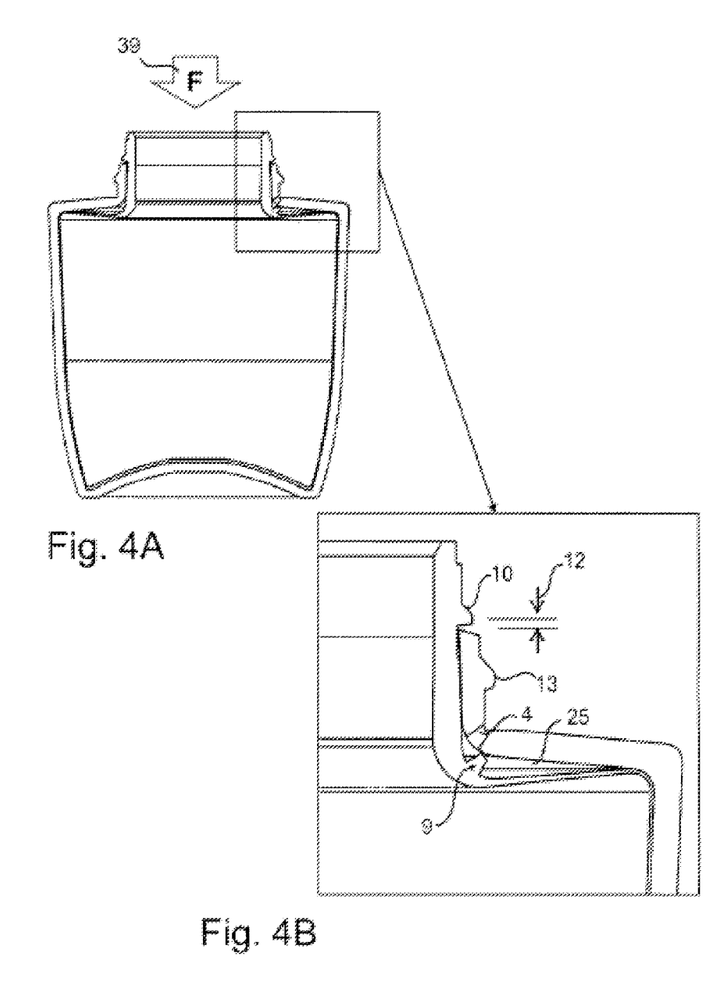
FIG. 4A is a cross section of a dispenser container in the shifted state.
FIG. 4B is a detail of FIG. 4A.

FIG. 4A and the detail of FIG. 4A shown in FIG. 4B show the dispenser container 1 in a shifted state, meaning that the first outlet region 6 is or has been shifted with respect to the second outlet region 7.

A shift of the first outlet region 6 was brought about by an action of force 39 on the first outlet region 6 along the shift direction 38.

The first outlet region 6 is pushed along the shift direction 38 or the central axis M into the interior of the dispenser container 1, the first spacing 11 being reduced to a second spacing 12.

In the shifted state, as can be seen in particular from FIG. 4B, as a result of the shift of the first outlet region 6 longitudinally with respect to the second outlet region 7, the first projection 9 has likewise been shifted, in such a way that it now no longer seals the pressure compensation opening 4, making pressure compensation possible. The first projection being released from the pressure compensation opening and shifting laterally relative to a central axis through the pressure compensation opening upon shifting of the first outlet region longitudinally relative to the second outlet region. Moreover, as a result of the shift, the inner container 3 has deformed, and this has caused a region 25 to form between the inner container 3 and the outer container 2.

If in the shifted state fluid is now withdrawn from the dispenser container 1, the resulting negative pressure is compensated through the pressure compensation opening 4, since as a result external air can flow into the dispenser container 1.

As a result of the deformation of the inner container 3 due to the shift of the first outlet region 6 relative to the second outlet region 7, a region 25 has been formed between the inner container 3 and the outer container 2, and is in contact with the environment via the pressure compensation opening 4, since likewise as a result of the shift of the first outlet region 6 the first projection 9 no longer seals the pressure compensation opening 4.

Figure 5A:
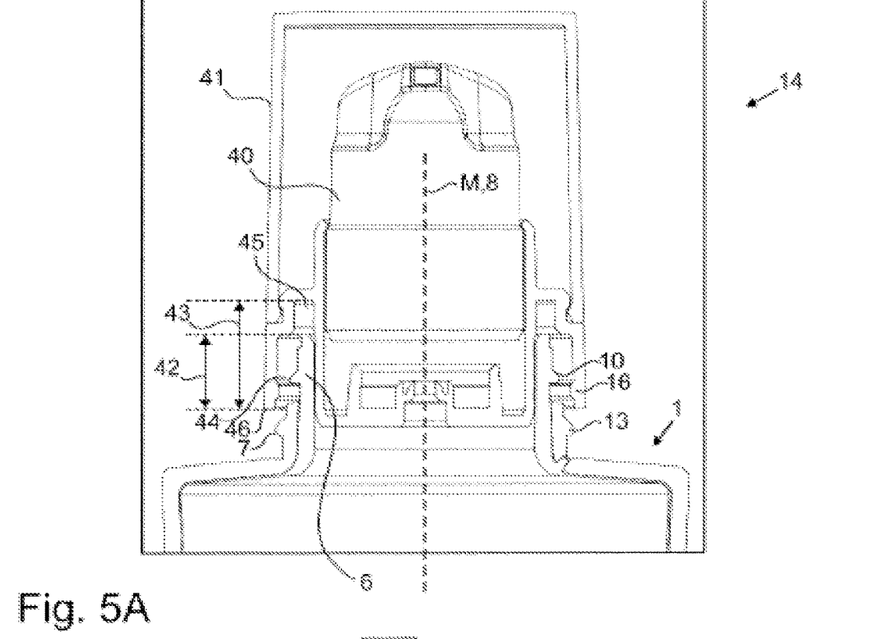
FIG. 5A is a cross section of a dispenser container with pump device in the unshifted state.
Figure 5B:
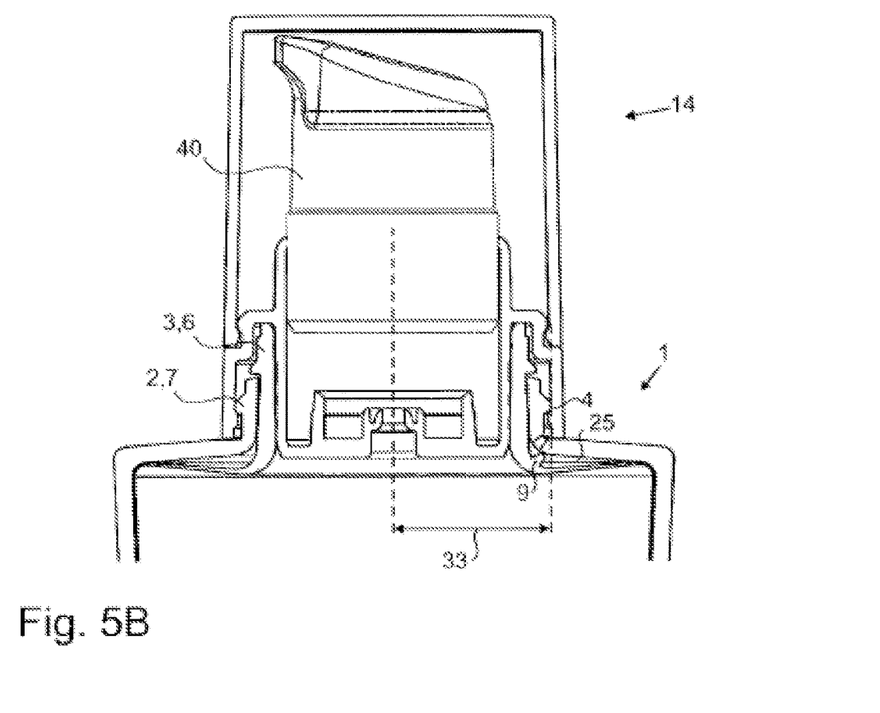
FIG. 5B is a cross section of a dispenser container with pump device in the shifted state.

FIGS. 5A and 5B are each a cross section of a dispenser container 1 comprising a pump device 14, the pump device 14 not yet being connected to the dispenser container 1 in FIG. 5A and the pump device 14 being connected to the dispenser container 1 in FIG. 5B. Preferably, the pump device 14 has a pump 40, and also preferably a cap 41, which is connected to the pump 40 in such a way that the pump is protected from the environment.

Advantageously, the pump device 14 has a first receiving region 44 and a second receiving region 45, the first receiving region 44 extending in the direction of the central axis M or the outlet direction 8 over a first length 42, and the second receiving region 45 extending in the direction of the central axis M or the outlet direction 8 over a second length 43. The lengths 42, 43 are each as seen from a lower end 46 of the pump device 14 in the same direction.

Also preferably, the receiving regions 44, 45 are formed in such a way that the second outlet region 7 can be received by the first receiving region 44 and the first outlet region 6 can be received by the second receiving region 45.

Preferably, the first outlet region 6 extends further in the outlet direction 8 than the second length 43 of the second receiving region 45, the first outlet region 6 subsequently being shifted with respect to the second outlet region 7 as a result when the pump device 14 is fitted.

Further, the pump device 14 advantageously has a fourth projection 16, which can be brought into contact with the third projection 13 and thus locks the pump device 14 with respect to the dispenser container 1.

FIG. 5B shows the elements of FIG. 5A, but with the pump arrangement 14 fitted onto the dispenser container 1. As can be seen, fitting the pump device 14 on the dispenser container 1 has caused a shift of the first outlet region 6 relative to the second outlet region 7, and as a result the first projection 9 no longer seals the pressure compensation opening 4 and the region 25 has formed.

It can further be seen that the third projection 13 is now in contact with the fourth projection 16 so as to lock the pump device 14 with respect to the dispenser container 1.

It can be seen here that the pressure compensation opening 4 is arranged within a region having the first distance 33 as a radius about the central axis M, the first distance being arranged between the central axis M and the farthest point, as seen perpendicular to the central axis M, of the third projection 13. This first distance 33 likewise corresponds to a maximum internal radius of the pump device 14. Further, as a result of the fitting the lower end 46 of the pump device 14 is now in non-tight contact with the outer container 2, meaning that air can still flow through from the environment. This further means that the pressure compensation opening 4 is protected from the environment by the pump device 14, meaning that no foreign particles can arrive in the dispenser container 1 through the pressure compensation opening 4 and said container is protected from damage.

Figure 6:
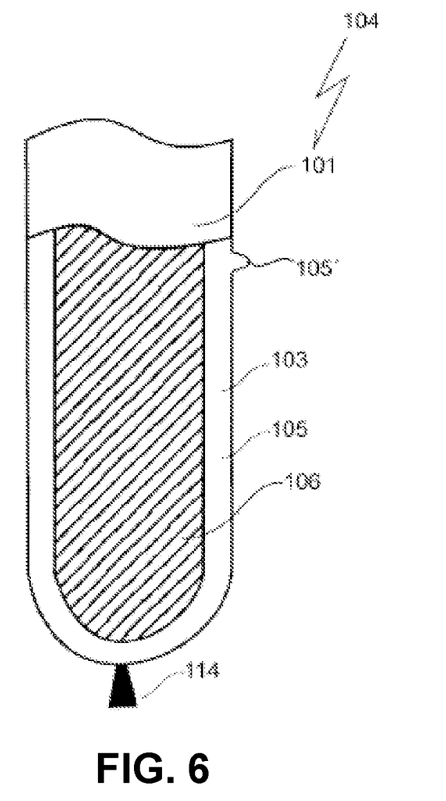
FIG. 6 shows the preform in the first cavity.

FIG. 6 shows a first part of a multi-component injection-moulding device 104 for injecting on a preform 101 consisting of at least two layers 102, 103, the plastic of the first layer 103 not forming an integral connection with the plastic of the second layer 102 and the plastic of the first layer 103 having a higher elasticity than the plastic of the second layer 102. The device comprises an injection blow-moulding core 106, which is located in a first cavity 105. A first layer 103 is injected into this first cavity 105 by a feed means 114. In this context, the cavity 105 has a first projection-forming portion 105', which forms the first projection 9 of the dispenser container 1.

Figure 7:
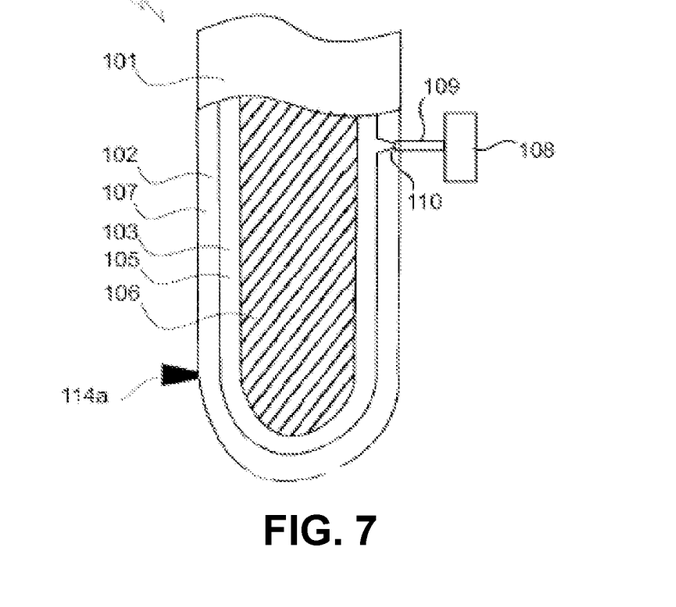
FIG. 7 shows the preform in the second cavity with slider core.

FIG. 7 shows a second cavity 107 of the multi-component injection-moulding device 104. The injection blow-moulding core 106 having the first layer 103 already injected on is located in this second cavity. Further, a slider core 108 comprising a projection 109 can be introduced into the second cavity 107, in such a way that the projection 109 touches the first layer 103, specifically where the first projection 9 is to be formed. When the second plastic is injected into the second cavity 107 by a further feed means 114*a*, the projection of the slider core recesses a region 110 formed by the pressure compensation opening 4. The invention is not limited to the arrangement points shown in FIGS. 6 and 7 of the feed means 114, 114*a* on the respective cavities 105, 107.

Figure 8:
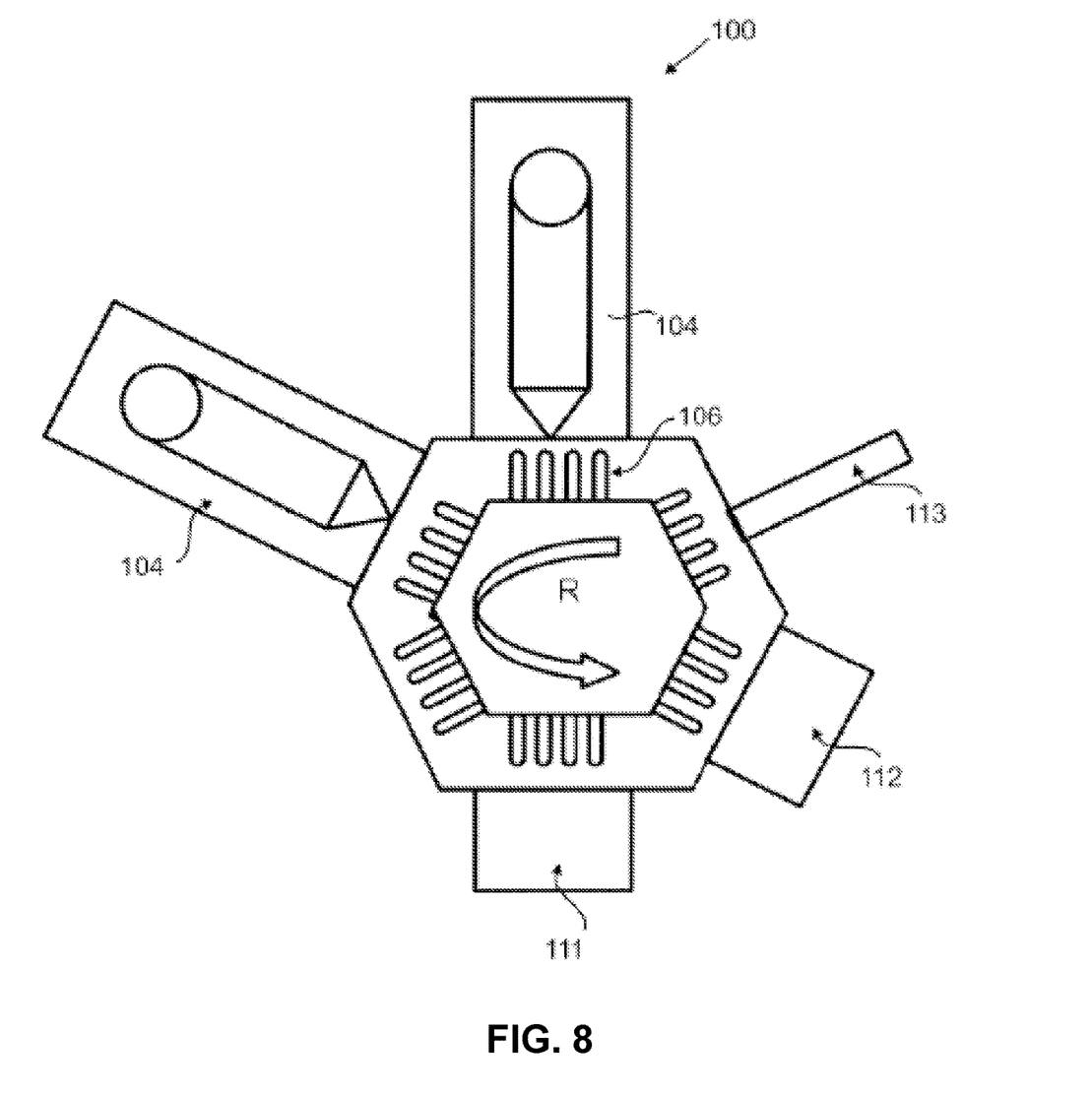
FIG. 8 shows a device for manufacturing the dispenser container.

FIG. 8 schematically shows the device 100 for manufacturing a dispenser container 1, consisting of an outer container 2 and an inner container 3 for receiving a fluid in injection blow-moulding for injection-moulding a preform 101 and for stretch-blowing the preform 101 within the same device 100. As well as the multi-component injection-moulding device 104 described previously in FIGS. 6 and 7, the device 100 further has a stretch-blowing means 111 for stretch-blowing the preform 101, which is heated by an injection-moulding process and is at a working temperature required for the stretch-blowing. Further, a cooling means 112 for cooling the expanded dispenser container 1 and a withdrawal means 113 for removing the finished dispenser container 1 from the device 100 are present.

All features disclosed in the application documents are claimed as essential to the invention as long as they are novel individually or in combination in respect of the prior art.

LIST OF REFERENCE NUMERALS

1 Dispenser container
2 Outer container
3 Inner container
4 Pressure compensation opening
5 Region
6 First outlet region
7 Second outlet region
8 Outlet direction
9 First projection
10 Second projection
11 First spacing
12 Second spacing
13 Third projection
14 Pump device
15 Holding device
16 Fourth projection
17 Central region
18 Base region
19 First transition region
20 Second transition region
21 Outer face of inner container
22 Inner face of inner container
23 Outer face of outer container
24 Inner face of outer container
25 Region
26 First thickness
27 Second thickness
28 Outlet region
29 Third thickness
30 Fourth thickness
31 First internal radius
32 Second internal radius
33 First distance
34 First portion
35 First portion
36 Second portion
37 Second portion 38 Shift direction
39 Force
40 Pump
41 Cap
42 First length
43 Second length
44 First receiving region
45 Second receiving region
46 Lower end
100 Device
101 Preform
102 Second layer
103 First layer
104 Injection-moulding device
105 First cavity
105' Projection-forming region
106 Injection blow-moulding core
107 Second cavity
108 Slider core
109 Projection on the slider core
110 Recessed region in the second layer
111 Stretch-blowing means
112 Cooling device
113 Withdrawal device

I claim:

1. A dispenser container comprising an outer container and an inner container for receiving a fluid,
wherein the outer container and the inner container are formed from blow-molded plastics, which do not form an integral connection with one another, and a first plastic from which the inner container is formed has a higher elasticity than a second plastic from which the outer container is formed, such that the inner container is deformable, and wherein the outer container has at least one pressure compensation opening for pressure compensation in a region between the outer container and the inner container, wherein the inner container has a first outlet region and the outer container has a second outlet region, the first outlet region extending inward of the second outlet region and further in an outlet direction than the second outlet region, and wherein the entire first outlet region is able to be shifted longitudinally in a shift direction relative to the second outlet region and toward an interior of the inner container and the outer container, and
wherein the inner container comprises, on an outer face, at least one complementary first projection for sealing the pressure compensation opening, the at least one complementary first projection projecting into the pressure compensation opening and being connected to the pressure compensation opening before a shift of the first outlet region longitudinally in the shift direction relative to the second outlet region, and the at least one complementary first projection being released from the pressure compensation opening and shifting laterally relative to the pressure compensation opening upon shifting of the entire first outlet region longitudinally in the shift direction relative to the second outlet region.

2. The dispenser container according to claim 1, wherein the pressure compensation opening is arranged on the second outlet region.

3. The dispenser container according to claim 1, wherein the second outlet region comprises an additional projection, which extends substantially perpendicular to the outlet direction.

4. The dispenser container according to claim 1, wherein the projection projecting into the pressure compensation opening is non-positively connected to the pressure compensation opening before the shift of the first outlet region relative to the second outlet region.

5. An assembly comprising the dispenser container according to claim 1 and a pump device for fitting on the dispenser container, wherein the pump device is formed in such a way that the first outlet region is shifted relative to the second outlet region while the pump device is being fitted on the dispenser container.

6. The assembly according to claim 5, wherein a holding device is provided with a fourth projection, which, after the fitting, is connected to a third projection by means of at least one selected from the group of snap-on, crimp and screw connections.

7. The dispenser container as in claim 1, wherein the at least one complementary first projection shifts laterally relative to a central axis through the pressure compensation opening upon shifting of the first outlet region longitudinally relative to the second outlet region.

8. The dispenser container as in claim 1 wherein the pressure compensation opening is formed in a transition between the second outlet region and a central region of the outer container.

* * * * *